(12) United States Patent
Kar et al.

(10) Patent No.: US 10,789,620 B2
(45) Date of Patent: Sep. 29, 2020

(54) USER SEGMENT IDENTIFICATION BASED ON SIMILARITY IN CONTENT CONSUMPTION

(71) Applicant: Adobe Inc., San Jose, CA (US)

(72) Inventors: Wreetabrata Kar, West Lafayette, IN (US); Viswanathan Swaminathan, Saratoga, CA (US); Somdeb Sarkhel, Dallas, TX (US)

(73) Assignee: ADOBE INC., San Jose, CA (US)

( * ) Notice: Subject to any disclaimer, the term of this patent is extended or adjusted under 35 U.S.C. 154(b) by 609 days.

(21) Appl. No.: 15/424,606

(22) Filed: Feb. 3, 2017

(65) Prior Publication Data
US 2018/0225710 A1 Aug. 9, 2018

(51) Int. Cl.
*G06Q 30/02* (2012.01)

(52) U.S. Cl.
CPC ..... *G06Q 30/0254* (2013.01); *G06Q 30/0201* (2013.01); *G06Q 30/0204* (2013.01)

(58) Field of Classification Search
CPC .................................. G06Q 30/0254
USPC .................................. 705/14.53
See application file for complete search history.

(56) References Cited

U.S. PATENT DOCUMENTS

| 7,953,777 B2 * | 5/2011 | White | G06F 16/9535 |
| | | | 715/760 |
| 8,229,873 B1 * | 7/2012 | Dolan | G06Q 30/00 |
| | | | 706/45 |
| 2013/0007020 A1 * | 1/2013 | Basu | G06F 16/367 |
| | | | 707/750 |
| 2013/0035985 A1 * | 2/2013 | Gilbert | G06Q 10/06375 |
| | | | 705/7.31 |

OTHER PUBLICATIONS

A. M. Ahmad Wasfi. Collecting user access patterns for building user atterns and collaborative filtering. In Proceedings of the 4th international conference on Intelligent user interfaces, pp. 57-64. ACM, 1998.
F. M. Harper and J. A. Konstan. The movielens datasets: History and context. ACM Transactions on Interactive Intelligent Systems (TiiS), 5(4):19, 2015.
F. Hopfgartner and J. M. Jose. Semantic user profiling techniques for personalised multimedia recommendation. Multimedia systems, 2010.
I. Jolliffe. Principal component analysis. Wiley Online Library, 2002.

(Continued)

*Primary Examiner* — Azam A Ansari
(74) *Attorney, Agent, or Firm* — Keller Jolley Preece

(57) ABSTRACT

The present disclosure is directed toward systems and methods for identifying user segments. In particular, the systems and methods described herein evaluate user session logs to gather media content consumption history information associated with a plurality of users. Additionally, the systems and methods described herein analyze items of media content to identify keywords, genres, and other attributes, and further represent the items of media content as vectors. The systems and methods follow an algorithm to group items of media content into clusters and, based on the clusters of media content, further group users of media content into user clusters (e.g., user segments).

20 Claims, 9 Drawing Sheets

(56) References Cited

OTHER PUBLICATIONS

C. Ono, M. Kurokawa, Y. Motomura, and H. Asoh. A context-aware movie preference model using a bayesian network for recommendation and promotion. In User Modeling 2007, pp. 247-257. Springer, 2007.

P. J. Rousseeuw. Silhouettes: a graphical aid to the interpretation and validation of cluster analysis. Journal of computational and applied mathematics, 20:53-65, 1987.

G. Salton, A. Wong, and C.-S. Yang. A vector space model for automatic indexing. Communications of the ACM, 18(11):613-620, 1975.

H. Yu, D. Zheng, B. Y. Zhao, and W. Zheng. Understanding user behavior in large-scale video-on-demand systems. In ACM SIGOPS Operating Systems Review, vol. 40, pp. 333-344. ACM, 2006.

* cited by examiner

USER SEGMENT IDENTIFICATION BASED ON SIMILARITY IN CONTENT CONSUMPTION

BACKGROUND

The growth of online media consumption requires content providers and advertisers alike to effectively gather data on media content consumption to stay on top of understanding the online media market. Predicting end users of online media content and having actionable insights into end user consumption behavior is important for both online content providers and advertisers to understand the online media market. Problems exist, however, for online content providers and advertisers in obtaining reliable user content consumption data. For example, conventional systems require intrusive access to private user information to provide customized media content to users. Additionally, even with such access, conventional systems provide media content that is not well tailored to users.

As mentioned, conventional systems often require the use of private user information to provide customized media content to users. Traditionally, modeling user behavior of online media content consumption requires access to demographic data such as age, gender, occupation, etc. Unfortunately, conventional systems therefore require intrusive access to information that, to many, seems impertinent to customization of online media content. Many users would prefer not to give up such private information. Conventional systems thus fail to protect private user information in an effort to provide users with customized online content.

As further mentioned, conventional systems provide media content that is not well tailored to users. Many users would rather not divulge private information in exchange for customized media content, and these users often provide false information. Because gathering user demographic data is difficult and because demographic data provided by users is often inaccurate, accurately identifying patterns in user content consumption to predict future user consumption behavior is difficult. Accordingly, content recommendation in conventional systems is inaccurate and slow. For the same reasons, advertising campaigns using conventional systems are traditionally not well targeted to consumers and are therefore less effective.

Thus, there are several disadvantages with regard to conventional media content recommendation methods and systems.

SUMMARY

One or more embodiments described herein provide benefits and solve one or more of the foregoing or other problems in the art with systems and methods for providing and/or modifying customized online media content for users with a two-step classification algorithm. In particular, the systems and methods modify media content according to a heuristically constructed content consumption model. The systems and methods analyze online media content and user content consumption to create behavioral models of user content consumption on a large scale. The systems and methods provided also inform tailored content recommendations to users based on content similarities and consumption similarities (e.g., similarities in content consumption activity of users). Additionally, the systems and methods described herein provide actionable insight for customizing content to target particular users or groups of users by providing users with media content compatible with the constructed behavioral models. To illustrate, the systems and methods described herein exploit content metadata to find similarities in online media content. Additionally, the systems and methods evaluate media content consumption activity of users of online media content to group users with similar content consumption histories together.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1A:
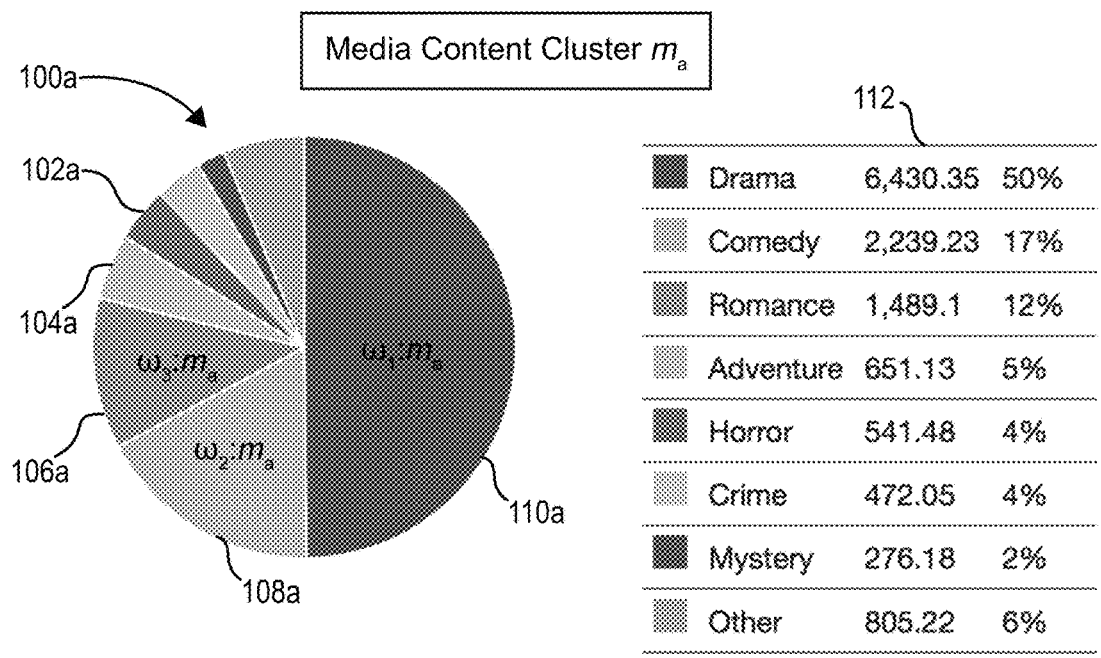
FIGS. 1A and 1B illustrate exemplary media content clusters of an example user segment identification system in accordance with one or more embodiments.

One or more embodiments described herein include a user segment identification system that provides and/or modifies online media content according to constructed user content consumption behavioral models. The user segment identification system described herein improves media content recommendations and/or targeted advertising to users by using a two-step algorithm to identify user segments having similarities in online media content consumption. In particular, the user segment identification system analyzes portions or items of media content to gather metadata information. In conjunction with analyzing media content, the user segment identification system also analyzes user session logs. Based on the analysis of media content and user session logs, the user segment identification system constructs behavioral models to inform predictions of content customization and/or modification.

As mentioned, the user segment identification system analyzes items of media content. Generally, the segment identification system gathers metadata information associated with individual items of media content to find metadata-based similarities between two or more items. The user segment identification system uses an algorithm to create clusters (e.g., meta-genres) of like items of media content by grouping similar media items together.

It is generally true that similar users consume similar media content. To customize and/or modify media content for users or groups of users, the user segment identification system constructs behavioral models for groups (e.g., segments or clusters) of users based on the above-mentioned analyses of media content and user session logs. Put simply, the user identification system utilizes a two-step algorithm to generate actionable insight into user media content consumption. Generally, as mentioned, the first step involves analyzing and grouping media content into clusters. Additionally, the second step involves using the media content clusters to identify segments or groups of users that have a history (e.g., as discerned from user session logs) of consuming media content within the grouped media content clusters.

By utilizing the two-step algorithm to identify user segments based on similarity in content consumption, the user segment identification system described herein generates more accurate predictions of user content consumption (e.g., behavioral models). The user segment identification system uses a more intelligent vector-based algorithm to customize media content to target particular users or groups of users. Customizing media content includes more intuitively modifying media content such that the content is more similar to media content found within one or more particular media clusters that is associated with the particular user or group of users (e.g., found within user session logs), as mentioned above. In other words, the user segment identification system uses a better prediction model to predict types (e.g., genres) of content that a particular user or group of users would be likely to consume. This prediction is based at least in part on the metadata similarities identified in the media clusters associated with the user or group of users as well as the media content consumption history (e.g., user session logs) of the user or group of users. The constructed behavior models are more accurate because they result from the analysis of user session logs in conjunction with the analysis of media content, thereby resulting in more a cohesive correlation. Thus, the user segment identification system provides more accurate insight into user media content consumption behavior.

As a result of generating more accurate behavior models, the user segment identification system predicts user content consumption more accurately as well. This in turn allows the user segment identification system to recommend content targeted to particular users or conversely to recommend users likely to consume particular media content, both with greater accuracy and effectiveness. Therefore, in some embodiments, the user segment identification system customizes or modifies media content more effectively than alternative systems.

As also mentioned, the user segment identification system provided does not use private user information to customize media content. The user segment identification system instead utilizes content metadata as well as user sessions logs to heuristically analyze user behavior associated with media content consumption, without the need for intrusive knowledge of private user information (e.g., demographic information). Accordingly, the user segment identification system described herein protects user privacy better than alternative systems.

The user segment identification system also provides faster user and/or content recommendations. The user segment identification system customizes user groups or else customizes media content by using more efficient vector-based calculations to generate behavioral content consumption models. Additionally, by utilizing only readily available and quickly accessible metadata information as opposed to potentially inaccurate, user-dependent demographic information, the user segment identification system more quickly generates user behavior models. Thus, the user segment identification system is faster than alternative systems because the user segment identification system described herein utilizes a two-step vector scheme that considers easily accessible information.

The user segment identification system described herein also uses less memory than other user segment identification systems. Because the user segment identification system utilizes a two-step algorithm based on weighted vector calculations, the user segment identification system stores less information (e.g., by not considering demographic information) and thereby uses less memory than other segment identification systems.

Figure 1B:
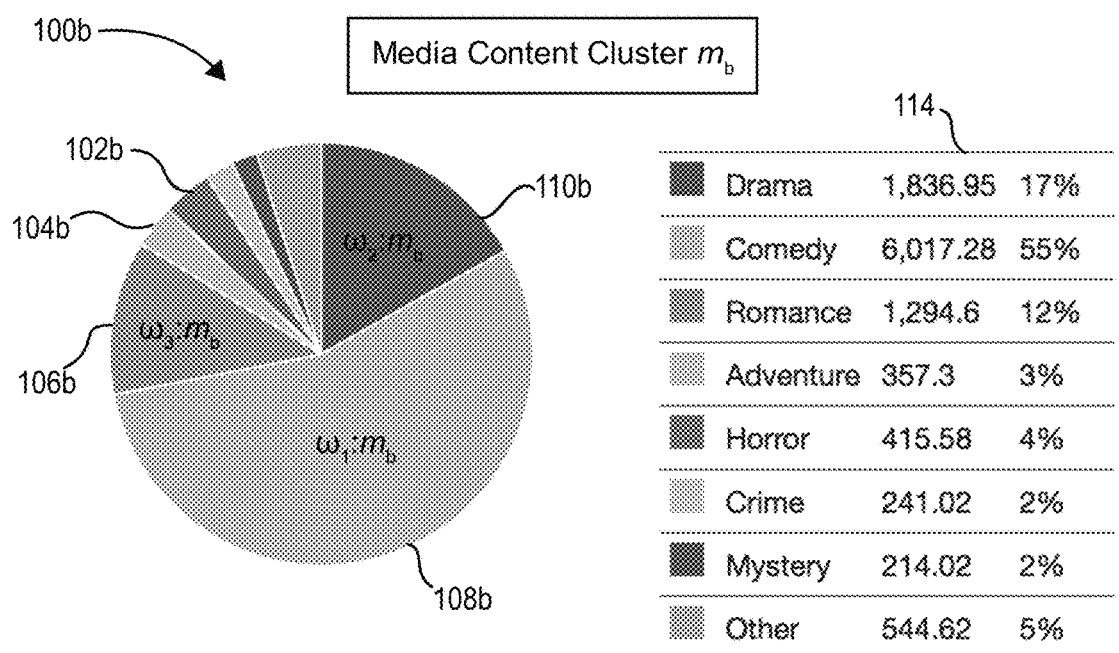

More details regarding the user identification system will now be provided with reference to the Figures. In particular, an example algorithm is provided below for reference throughout the description of the Figures. In particular, step one of the two-step Algorithm will be described with reference to FIGS. 1A and 1B, and step two of the two-step algorithm will be described with reference to FIGS. 2A and 2B. FIGS. 1A-1B are described in relation to movies. One will appreciate that the present disclosure is not so limited and the steps, methods and algorithms can be applied to other media items, such as those described hereafter. In particular, as used herein, media content includes any form of digital or online content such as movies, videos, images, songs, audiobooks, recordings, or any form of content associated with online user consumption. Moreover, the media content described herein includes any particular format or encoding of respective items of content including, but not limited to, MP3, MP4, MPEG, JPG, GIF, PNG, TIFF, MOV, M4A, etc.

FIGS. 1A and 1B depict exemplary media content clusters (e.g., meta-genres) as grouped by the user segment identification system. In particular, FIG. 1A shows chart 100a representing a media content cluster $m_a$ including multiple weighted genres or attributes. As shown in FIG. 1A, media content cluster $m_a$ includes genres 102, 104, 106, 108, and 110 corresponding to the genres shown in table 112. For example, genre 110 corresponds to "Drama" as shown in table 112. As shown in FIG. 1B, chart 100b represents media content cluster $m_b$ and includes attributes (e.g., genres) 102-110 like those depicted in FIG. 1A, but with different sizes corresponding to the values found in table 114. More detail will now be provided regarding the generation of the media content clusters (e.g., meta-genres) $m_a$ and $m_b$ and the attributes (e.g., genres) 102-110 with further reference to FIGS. 1A and 1B.

As shown in FIG. 1A, the user segment identification system generates meta-genres such as media content cluster $m_a$. As used herein, a meta-genre is a classification given to a cluster or grouping of items of media content that share one or more common attributes. More specifically, in some embodiments a meta-genre refers to a categorization of items of media content given by choosing the top weighted genres (e.g., the top two or three weighted genres) or attributes within a media content cluster to define as the meta-genre of the particular media content cluster. To illustrate, the user segment identification system analyzes one or more items of digital media content. As used herein, media content includes movies, songs, audio books, audio clips, pictures, video clips, television shows, images, books, video games, etc.

In some embodiments, the user segment identification system analyzes pieces of text indirectly associated with the item of media content. For example, some items of media content (e.g., movies, songs, video games, etc.) have pieces of written material associated with them. To illustrate, a movie has a synopsis, a list of people involved in production (e.g., actors, directors, etc.), an editorial, a critic review, or other form of text written about the movie. The user segment identification analyzes all or part of these texts associated with the item of media content by parsing the text therein to identify a number of keywords, people, and/or other traits within the text. For example, in one embodiment the user segment identification system parses the text of the synopsis, casting credits, and/or the textual representation of the movie script to identify actors, directors, genres, themes, and other attributes associated with the particular movie.

In one or more embodiments, the user segment identification system analyzes items of media content by converting each item of media content into a recognizable form of information. In these or other embodiments, the user segment identification system represents an item of media content as a string of characters. To represent an item of media content (e.g., a movie or song) as a string of characters, the user segment identification system performs audio recognition to identify each word throughout the item of media content. The user segment identification system transposes each word into text form for further analysis. For example, the user segment identification system transposes the lyrics of a song or the script of a movie into text by performing audio recognition or other audio-to-text or speech-to-text techniques.

In other embodiments, the user segment identification system does not convert an item of media content into text form where, for example, the item of media content is already in a text form in its native state. For example, in the case of a book or other text-based item of media content, the user segment identification system need not perform any conversion to text form. Instead, the user segment identification system uses the native text of such items of media content to perform text analysis. For example, the user segment identification system trains a model to identify terms within a text that relate to a particular topic, genre, or other attribute associated with the item of media content.

As mentioned, the user segment identification system parses the text (i.e., the characters) of a piece of text associated with an item of media content to identify terms. Additionally, the user segment identification system builds a database of keywords, people, and/or other traits associated with each item of media content that is analyzed. In particular, the user segment identification system identifies key terms, genres, or other traits by correlating the use of certain words or certain word patterns with particular attributes. For example, the use of certain specific words in particular sentence structures may indicate that an item of media content has a heavy war theme, or else, for another example, that an item of media content is intended to be comedic. In these or other embodiments, the user segment identification system utilizes a machine learning model to analyze text associated with an item of media content and further to identify patterns and themes throughout the text. In this way, the user segment identification system represents each item of media content as a list of genres, keywords, or other traits to more easily associate like items of media content together.

Additionally, the user segment identification system uses, in some embodiments, a term prioritization technique to identify those terms that are most indicative of traits associated with the item of media content. The user segment identification system uses a machine learning model to rank terms and thereby more accurately represent each item of media content by its most relevant and insightful terms. For example, in some embodiments, the user segment identification system considers only those terms ranked highest while in other embodiments the user segment identification system considers all terms within a relevant text. The user segment identification system defines or represents each item of media content by the considered or chosen terms identified within the text representation of the item as described.

In the same or other embodiments, the user segment identification system does not convert each item of media content into a text form, but instead analyzes the audio of each item of media content. In these embodiments, the user segment identification system performs audio recognition to identify keywords within an item of media content. The user segment identification builds a database of key terms, genres, or other attributes based on the analysis of the audio. In some embodiments, the user segment identification system uses an audio-based machine learning model to identify common themes or other attributes associated with an item of media content, as described above. The user segment identification system thus represents each item of media content a list of genres, keywords, or other attributes in much the same way as previously described with respect to text-based analysis.

In still other embodiments where an item of media content does not contain any words and/or text, the user segment identification system does not perform a conversion to text format. Instead, the user segment identification system performs, for example, an image or video analysis. The user segment identification system analyzes an image and/or video to identify shapes, colors, faces, words, or other attributes within the image to come up with a representation of each item of media content. In these embodiments, the user segment identification system generates relevant descriptor words relevant to the item of media content and based on the image and/or video analysis. In this way, the user segment identification system represents any item of media content as a text-based listing of keywords.

As mentioned, the user segment identification system represents each item of media content as a list of genres, keywords, or other attributes. In these or other embodiments, the user segment identification system considers this representation as a text document. In other words, the user segment identification system converts each item of media content into a text document containing a list of relevant attributes (e.g., actor names, director names, genres, artists, etc.). To illustrate, the user segment identification system identifies a number of genres associated with a particular item of media content by analyzing the item to identify terms within the text document representation of the item based on the above-mentioned trained machine learning model. The user segment identification system uses the text representation of each item of media content to group like items of media content together, as will be discussed in further detail below.

In some embodiments, the user segment identification system converts the textual representation of each item of media content into a vector space representation. To illustrate, the user segment identification system converts the list of genres, keywords, and other attributes associated with an item of media content into a vector. The user segment identification system uses the identified genres, keywords, and other attributes to define the vector representation of the item of media content. In other words, in some embodiments each vector has a number of dimensions where each dimension of the media content vector corresponds to a genre, keyword, or other attribute of the item of media content as taken from its textual representation.

As mentioned, the user segment identification system converts each item of media content into a vector space representation. To elaborate, a vector space model is an algebraic model for representing text documents (e.g., the textual representation of each item of media content) as vectors of index terms (e.g., genres, keywords, or other identified attributes within the text documents). The user segment identification system uses the vector models for information retrieval, indexing, and relevancy ranking, as will be described in more detail below. In the vector space model for each item of media content, each text document is represented as a vector of N dimensions by the following: $(\omega_1, \omega_2, \ldots \omega_N)$, where each dimension corresponds to a separate term (e.g., genre, keyword, or other attribute) and where $\omega_i$ represents the weight of each respective dimension of the vector.

To illustrate from FIGS. 1A and 1B, media content cluster $m_a$ represents a group of items of media content that share common attributes. In other words, media content cluster $m_a$ illustrates a group of items of media content that all share similar makeup—i.e., items of media content that are determined to be about 50% drama-oriented, 17% comedy-oriented, 12% romance-oriented, etc., represented by chart 100a. Additionally, from FIG. 1B, media content cluster $m_b$ illustrates a group 100b of items of media content that share a similar makeup as well, but one that is different from the group represented by chart 100a shown in FIG. 1A. The user segment identification system determines the significance of each genre by analyzing each individual item of media content as discussed above.

For illustrative purposes, it will be beneficial to consider each media content cluster $m_a$ and $m_b$ as shown in FIGS. 1A and 1B as each containing a single movie or other item of media content. It will be understood, however, that a media content cluster may contain many items of media content, not limited to those described herein. For example, in the following discussion, media content cluster $m_a$ can be referred to as movie $m_a$ and media content cluster $m_b$ can be referred to as movie $m_b$. This simplification will help with understanding that the user segment identification system performs on each individual item of media content, and how each attribute of each item of media content is identified. For example, the user segment identification system analyzes two different movies $m_a$ and $m_b$, the results of which analysis are depicted in FIGS. 1A and 1B, respectively. In particular, the user segment identification system analyzes the movie $m_a$ represented by chart 100a in FIG. 1A and further analyzes the movie $m_b$ represented by chart 100b in FIG. 1B. The user segment identification system analyzes each movie, including texts, synopses, cast credits, audio clips, etc., associated with each movie as discussed above. From the analysis, the user segment identification system identifies genres, themes, keywords, or other attributes. For example, in FIG. 1A, table 112 depicts various genres identified in the movie $m_a$ represented by chart 100a. Likewise in FIG. 1B, table 114 depicts the various genres identified in the movie $m_b$ represented by chart 100b. Importantly, as can be seen from tables 112 and 114, the movies represented by charts 100a and 100b contain similar themes or genres, though they are not identical.

The user segment identification system identifies similarities within the movies $m_a$ and $m_b$, but because the movies have different scripts, actors, and other features, the user segment identification system determines that the two movies do not have the same emphasis on each genre identified therein. Accordingly, the user segment identification system weights each dimension of the vector representations of items of media content. In FIGS. 1A and 1B, the user segment identification system weights each identified genre, keyword, or other attribute according to a vector weighting scheme to accommodate the fact that movies or other items of media content with similar underlying themes may have a different amount of a given theme (e.g., based on the number of related terms in the text representation) or heavier emphases on different aspects.

In particular, the user segment identification system uses a term frequency inverse document frequency (TF-IDF) weighting scheme to determine the weights of each respective vector dimension. TF-IDF weighting can be represented by the following:

$$\omega_{t,d} = tf_{t,d} \cdot \log \frac{|D|}{|\{d' \in D \mid t \in d'\}|}$$

where $tf_{t,d}$ is the term frequency of the term t for the document d, d' is the document d appended to itself (semantically, d and d' have the same content), and where D is the set of all documents. Given this, $|\{d' \in D \mid t \in d'\}|$ is the number of all documents containing the term t. Thus, in the above example illustrated in FIGS. 1A and 1B, the user segment identification system weights the drama genre, for example, differently in chart 100a than in chart 100b. As shown in FIGS. 1A and 1B, segments 110a and 110b represent "Drama" in charts 100a and 100b as shown in tables 112 and 114, respectively. Furthermore, segments 108a and 108b represent "Comedy," segments 106a and 106b represent "Romance," segments 104a and 104b represent "Adventure," and segments 102a and 102b represent "Horror." Considering each genre as a term or dimension in the TF-IDF equation in the context of weighting vector representations of items of media content, the TF-IDF equation can be shown by:

$$\omega_{g:m} = \log \frac{|M|}{|\{m' \in M \mid g \text{ is a genre of } m'\}|}$$

where M is the set of all media content (e.g., movies), g is a genre of m', and m is a movie within the set M.

To determine the different weights for each segment as shown in FIGS. 1A and 1B, the user segment identification system performs the TF-IDF calculation shown above. In particular, the user segment identification system analyzes the textual representation of movies $m_a$ and $m_b$ to determine a term frequency $tf_{t,d}$ of each term identified to correspond to each respective genre 102-110. The user segment identification system further uses the determined term frequency to calculate the weight of each dimension within the vector representing movies $m_a$ and $m_b$ according to the TF-IDF equation. As shown in FIG. 1A, for example, the genre "Drama" is shown by segment 110a (e.g., represented as dimension $\omega_{1:m_a}$), which has a weight as determined by the vector weighting scheme (e.g., TF-IDF). In this example, movie $m_a$ is themed 50% on the genre "Drama" as shown in table 112, as determined by the text analysis and the vector weighting described above. As further shown in this example, the user segment identification system uses the TF-IDF weighting formula to calculate a dimensional weight of dimension $\omega_{1:m_a}$ given to be 6,430.35 as also shown in table 112. Furthermore, segment 108a depicts the dimension $\omega_{2:m_a}$ with a visual representation of its respective weight as compared to the other dimensions of the vector representation of movie $m_a$. That is to say, the respective weight of each dimension is illustrated by the size of the segment as shown within chart 100a. Segment 108a corresponds to "Comedy" as shown in table 112. The user segment identification system uses the same vector weighting scheme (e.g., TF-IDF) to determine the weight of dimension $\omega_{2:m_a}$ as 2,239.23, thus comprising 17% of the movie $m_a$. The user segment identification system further calculates the dimensional weight of each dimension represented by the remaining segments 106a, 104a, 102a, and so on.

As shown in FIG. 1B, the user segment identification system analyzes movie $m_b$. As described above, the user segment identification system performs a text-based analysis to identify genres or keywords with the movie $m_b$ and then converts the text document representation of movie $m_b$ into a vector ($\omega_{1:m_b}, \omega_{2:m_b}, \omega_{3:m_b}, \ldots, \omega_{|G|:m_b}$). The user segment identification system weights each dimension of the vector as described above, based on the vector weighting scheme (e.g., TF-IDF). In the example shown in FIG. 1B, the movie $m_b$ is represented by chart 100b, where segment 110b depicts the genre "Drama" and its respective weight, segment 108b depicts the genre "Comedy" and its respective weight, as so on. As can be seen from FIG. 1B, movie $m_b$ shares many of the same genres as movie $m_a$ from FIG. 1A. However, as can also be seen from the FIGS. 1A and 1B, the weights of the dimensions of each respective vector representation of movies $m_a$ and $m_b$ are different based on the different words identified within the texts associated with each movie.

In other embodiments, the user segment identification system uses other vector weighting schemes. In such embodiments, the user segment identification system weights the dimension of each vector using alternative applicable vector weighting scheme. In these or other embodiments, the user segment identification system identifies a separate dimension within a given vector for each distinct term used within the analyzed text. In these embodiments, the user segment identification system weights each dimension based on the total number of uses of each term. In other embodiments, the user segment identification system weights each dimension based on a significance of each term used or by using any other relevant vector weighting scheme.

Now referring to FIGS. 1A and 1B as illustrating clusters of media content containing multiple items of media content, it will now be beneficial to consider chart 100a and chart 100b as each representative of a group of items of media content that share the attributes listed in table 112 and table 114. As mentioned above, FIG. 1A depicts a media content cluster $m_a$, which includes any number of items of media content that share genres, keywords, or other attributes. To illustrate, the user segment identification system clusters (e.g., groups) like items of media content together based on the analysis described above. As part of the first step of the two-step algorithm, the user segment identification system generates a set of meta-genres that are each made up of items of media content. In some embodiments, a meta-genre is a media content cluster (e.g., media cluster $m_a$ or media cluster $m_b$) or group of items of media content that share genres, keywords, or other attributes as identified by the analysis described above, as mentioned above. Referring again to step one of the two-step algorithm, the user segment identification system analyzes each item of media content to determine weights of each respective dimension based on the analysis of the text, then clusters like items of media content together into groups called media content clusters or meta-genres.

As used herein, clustering is when the user segment identification system identifies commonalties between items of media content within content metadata, character lists, cast credits, synopses, scripts, generated audio-to-text documents, etc. and groups like items of media content together. To illustrate, clustering is the task of grouping a set of objects in such a way that objects in the same group (called a "cluster") are more similar in some sense to each other than to those in other groups. In some embodiments, the user segment identification system clusters those items of media content with identified similarities using a clustering technique such as k-means clustering. K-means clustering is defined as follows: given a set of observations $X=\{x_1, \ldots, x_n\}$, find a k-partition $S=\{S_1, \ldots, S_k\}$ of X (namely, $\forall i$ $S_i \subseteq X$ and $\cup_{i=1}^{k} S_i = X$) such that the following objective function is minimized:

$$\arg_S \min \sum_{i=1}^{k} \sum_{x \in S_i} \|x - \mu_{S_i}\| \delta$$

where $\|\bullet\|\delta$ is a distance measure and $\mu_{S_i}$ (called the "cluster center") is the mean of the elements in $S_i$. In some embodiments, the distance measure $\|\bullet\|\delta$ is a Euclidean distance.

Additionally, in some embodiments the user segment identification system applies the Silhouettes coefficients equation to determine the number of clusters generated from the clustering step (e.g., clustering the items of media content by using k-means clustering). The Silhouettes coefficient formula can be modeled by:

$$s(i) = \frac{b(i) - a(i)}{\max(b(i), a(i))}$$

where a(i) is the average dissimilarity of i with all other data within the same cluster and b(i) is the lowest dissimilarity of i to any other cluster, of which i is not a member. The average s(i) over all data of a cluster is a measure of how tightly grouped all the data in the cluster are. Thus, the average s(i) over all data of the entire dataset is a measure of how appropriately the data has been clustered. The user segment identification system uses the Silhouette coefficient equation to choose the number of clusters in the clustering algorithm (e.g., k-means algorithm).

Figure 2A:
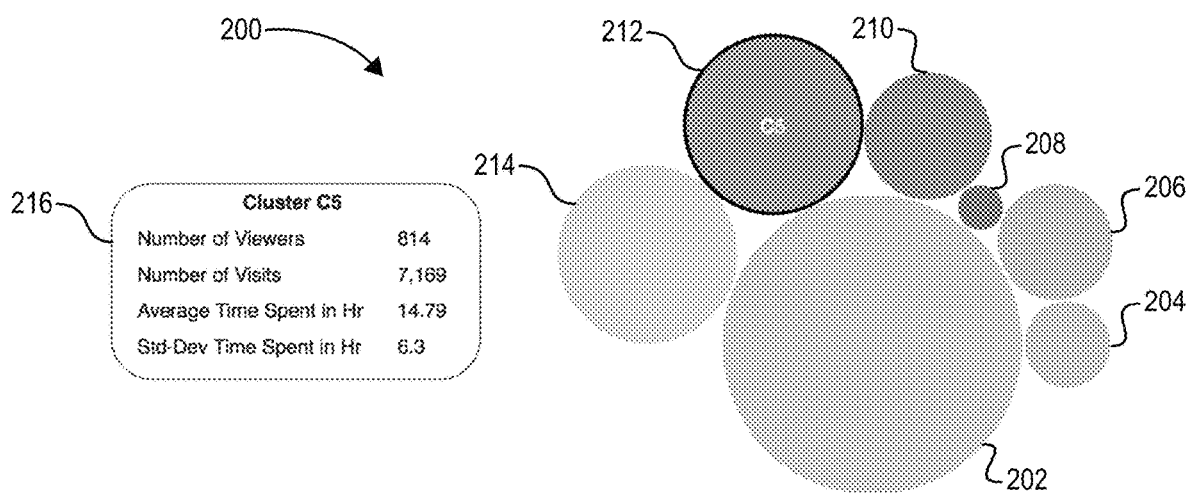
FIGS. 2A and 2B illustrate exemplary user clusters of an example user segment identification system in accordance with one or more embodiments.
Figure 2B:
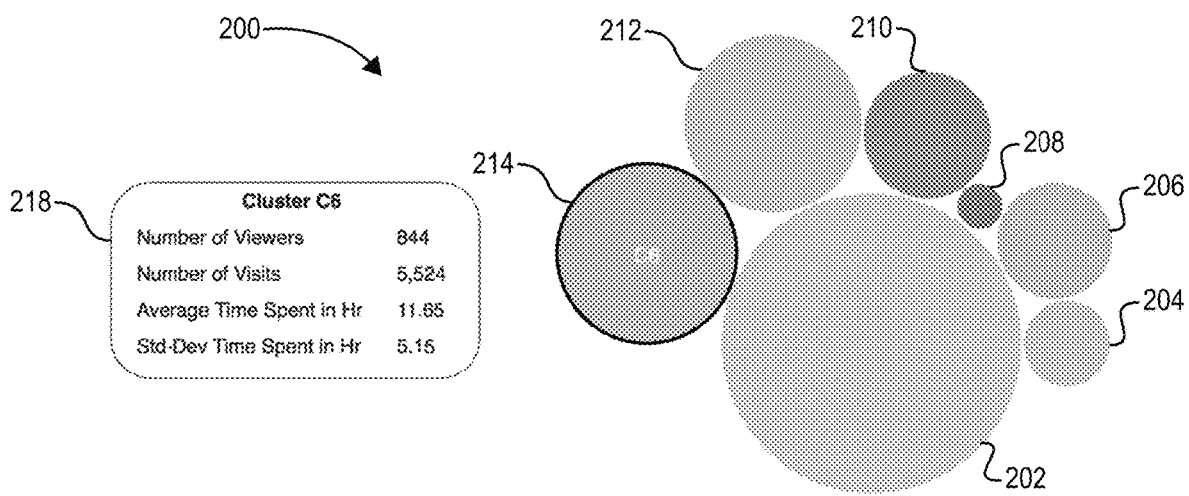

Looking now to FIGS. 2A and 2B, user segments 202-214 are shown. In particular, FIGS. 2A and 2B illustrate a number of circles representative of user clusters, where the size of each circle indicates a relative number of users who fall into each user segment (e.g., user cluster). Additionally, for reference purposes, FIG. 2A corresponds with FIG. 1A, meaning that the highlighted user segment 212 in FIG. 2A is the user segment corresponding to the media content cluster $m_a$ represented by chart 100*a* in FIG. 1A. Likewise, FIG. 2B corresponds with FIG. 1B, where the highlighted user segment 214 in FIG. 2B is the user segment corresponding to media content cluster $m_b$ represented by chart 100*b* in FIG. 1B. In conjunction with the above discussion regarding media content clustering, the following discussion relates to user clustering, or step two of the two-step algorithm. In particular, with reference to FIGS. 2A and 2B, the following discussion relates to how the user segment identification system identifies user segments. As used herein, a user segment is a user cluster or group of users that share at least one identified commonality as will be described in further detail below. The terms user segment and user cluster are interchangeable.

The user segment identification system performs the first step of the two-step algorithm (e.g., the media content clustering) as discussed above. Additionally, the user segment identification system performs the second step of the two-step algorithm by clustering users (e.g., by identifying user segments). As shown in FIG. 2A, each user segment 202-214 contains a number of users. For example, the highlighted user segment 212 in FIG. 2A contains 814 users as shown in table 216. Importantly, the size of each respective user segment 202-214 represents the relative number of users therein. For example, as shown in FIG. 2B, user segment 214 contains 844 users, and is therefore slightly larger than user segment 212.

To identify the user segments 202-214, the user segment identification system represents each user as a vector, similar to how the user segment identification system represents each item of media content as a vector. In particular, the user segment identification system represents each user as a vector such as $(v_{1:u}, v_{2:u}, \ldots, v_{|C_M|:u})$. Each user vector includes a number of dimensions that correspond to the number of media content clusters (e.g., meta-genres). The dimensionality (e.g., number of dimensions) does not necessarily change for every user, but remains consistent throughout the set of users. To illustrate, the user segment identification system represents a group of users who consume media content in three genres with 3-dimensional vectors.

The user segment identification system evaluates session logs of each media content user to gather various data related to media content consumption associated with each user. For example, the user segment identification system evaluates session logs to determine an amount of time the user has spent consuming each particular item of media content. In other embodiments, the user segment identification system evaluates session logs to make a Boolean determination of whether or not a given user has consumed any portion or all of a particular item of media content. The user segment identification system also determines which items of media content each user consumes as well as identifies any relevant metadata associated with the media content. For example, the user segment identification system evaluates user session logs to inform either the first step of the two-step or the second step, or both. In some embodiments, the user segment identification system gathers metadata related to content consumption of each user, and converts the metadata to a text document and generating media content vectors as described above. In the same or other embodiments, the user segment identification system gathers metadata associated with media content to generate user vectors based on media content consumption history associated with each user.

As also mentioned above, the user segment identification system analyzes user session logs. As used herein, a user session log is a record of user activity. A user session log includes information relating to identification, type, duration, and time of media content consumption associated with a given user. The user segment identification system analyzes user session logs to gather information relating to media content consumption. The gathered information informs the user segment identification in the process of designating user segments as described in more detail below.

In some embodiments, the user segment identification system accesses only data that is not related to an individual user profile, and thereby refrains from utilizing personal user information in an intrusive manner. For example, the user segment identification system does not use or require access to demographic information of users. Rather, the user segment identification system access user session logs to evaluate content consumption history of each user, as described.

In conjunction with representing each user as a user vector, the user segment identification system considers each media content cluster as a dimension within a given user vector, as mentioned. In addition to representing each user as a user vector, the user segment identification system weights each dimension within each user vector.

To weight the user vector dimensions, the user segment identification system uses a vector weighting scheme, similar to the vector weighting scheme previously discussed with reference to the media content vectors. For the user vectors, however, the user segment identification system uses, in some embodiments, a Boolean value for each dimension. In these embodiments, the user segment identification system determines whether a user associated with a user vector has consumed any item of media content from a particular media content cluster. In some embodiments, the user segment identification makes this determination based on whether the user has consumed the given item of media content in its entirety, while in other embodiments the user segment identification system makes this determination based on whether the user has consumed any part of the item of media content.

To help with more accurately clustering users based on preferences users may have for consuming items of media content from certain media content clusters (e.g., meta-genres) over others, the user segment identification uses more sophisticated weighting techniques in other embodiments. In these or other embodiments, the user segment identification system uses a "Time Watched" (TW) vector weighting scheme as modeled by:

$$v_{i:u} = \sum_{m \in C_M^{(i)}} T(u, m)$$

where $T(u, m)$ is the amount of time a user u has spent consuming an item of media content m, and where $C_M^{(i)}$ is the $i^{th}$ media content cluster. In these embodiments, the user segment identification system counts the number of items of media content from a particular media content cluster consumed by a given user. The user segment identification system uses the TW weighting scheme to cluster users according to time of content consumption. For example, this weighting scheme tends to help cluster users who watch longer movies in different clusters than those who watch shorter movies.

Moreover, in other embodiments, the user segment identification uses still other vector weighting schemes. For example, in some cases, a user may not consume an entire item of media content (e.g., by only watching a portion of a movie or listening to part of a song). Similarly, in some cases a user may consume only small parts of some items of media content before deciding that he or she does not prefer such media content. It would be therefore undesirable to consider short or negligible amounts of time of content consumption very heavily in the vector weighting scheme to cluster users according to consumption of content within the various media content clusters. Therefore, in some embodiments, the user segment identification system uses a "Normalized Time" (NT) vector weighting scheme as modeled by:

$$v_i = \frac{1}{Z} \sum_{m \in C_M^{(i)}} T(u, m), \text{ where } Z = \sum_i v_i$$

where T(u, m) is the amount of time a user u has spent consuming an item of media content m, and where $C_M^{(i)}$ is the $i^{th}$ media content cluster. This is similar to the TW weighting scheme mentioned above, but uses a normalization factor Z as shown. In some embodiments, the user segment identification system uses the NT weighting scheme to calculate the fraction of time a user has spent consuming media content from each identified meta-genre or media content cluster.

Returning now to FIGS. 2A and 2B, the user segment identification system has identified seven user segments 202-214. As shown in FIG. 2A, table 216 shows information relating to the consumption of media content by users within user cluster 212. As mentioned, user cluster 212 represents the 814 users who have content consumption histories similar enough that the user segment identification system clustered together after the two-step clustering algorithm. Each user segment 202-214 shown in FIGS. 2A and 2B represents user clusters that the user segment identification system grouped together by the above-mentioned steps.

The following is one example embodiment of a two-step classification algorithm as described above in relation to FIGS. 1A-2B.

---
Algorithm 1: Two-step Segment (User session log L)

---
Let M = {m} be set of all items of media content in L
Let U = {u} be set of all users in L
// media content clustering → Step 1
M' = {genre representation of M|M ∈ $\mathcal{M}$ }
Let M" be TF-IDF representation of $\mathcal{M}$ '
$\mathcal{C}_M$ = Cluster($\mathcal{M}$ ")
// user clustering → Step 2
Let V be a |U| × |$\mathcal{C}_M$| matrix
for each u ∈ U
    for i = 1 . . . |$\mathcal{C}_M$|
        V [u][i] = V [u][i] + weight(i:u)
$\mathcal{C}_U$ = Cluster(V)
return $\mathcal{C}_U$

--- where TF-IDF stands for term frequency inverse document frequency. TF-IDF is a particular method of weighting vector dimensions. Bold capital letters (e.g., U and M) denote a set, small letters (e.g., u and m) denote an individual element of the corresponding set, and collections or sets of sets are denoted by calligraphic or script letters (e.g., $\mathcal{M}$ or $\mathcal{C}$ ).

In some embodiments, the user segment identification system provides segment-based media content recommendations. In particular, the user segment identification system provides content recommendations based on the two-step clustering algorithm. For example, for a user who has not consumed a particular item of media content that is within a media content cluster associated with the user, the user segment identification system provides that particular item of media content as a recommendation to the user. In other embodiments, the user segment identification performs other determinations to make media content recommendations. For example, the user segment identification recommends items of media content that are similar to other items of media content already consumed by the user. To be precise, for a user u, the user segment identification system recommends the following set of items of media content:

$$M_{Reco}{}^u = M_{Pop}{}^{C_u} - M_{Seen}{}^{(u)}$$

where the user u belongs in the cluster $C_u$, $M_{Seen}{}^{(u)}$ are the items of media content that have already been watched by the user u, and $M_{Pop}{}^{C_u}$ are the top n popular items of media content in the cluster $C_u$.

Moreover, in some embodiments the user segment identification system provides user recommendations (e.g., user cluster recommendations) to media content producers and/or advertisers. In these embodiments, the user segment identification uses the two-step clustering algorithm described above to identify user segments containing users who have a propensity to consume media content with particular attributes or within particular genres. The user segment identification system further provides insight to advertisers or media content producers for customizing media content that is more tailored to contain the various attributes that are appealing to users of certain user segments.

Figure 3A:
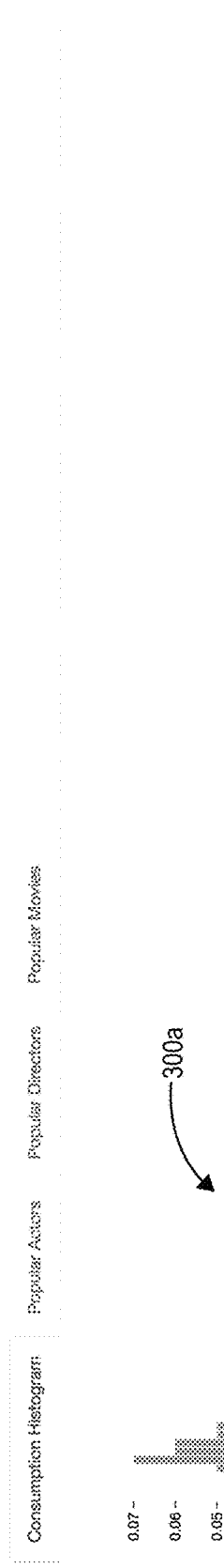
FIGS. 3A and 3B illustrate exemplary consumption histograms of media content consumption relating to user clusters of an example user segment identification system in accordance with one or more embodiments.
Figure 3B:
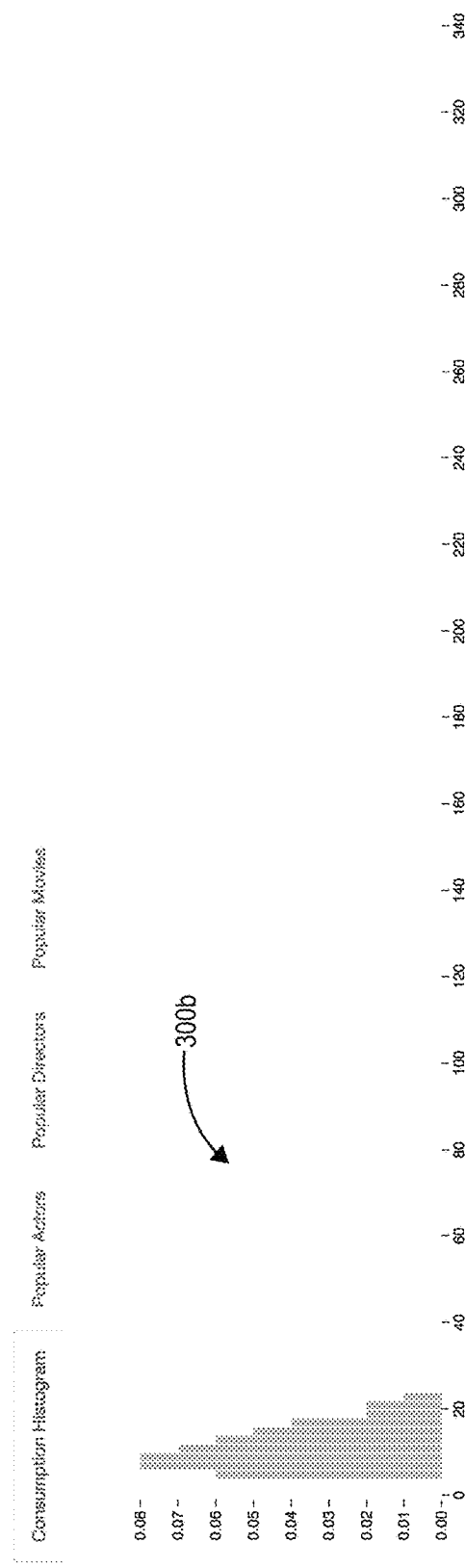

Looking now to FIGS. 3A and 3B, the user segment identification system also generates consumption history information corresponding to each user cluster as shown in FIGS. 2A and 2B. In particular, the consumption histogram 300a of FIG. 3A depicts the media content consumption of user cluster 212 highlighted in FIG. 2A. Additionally, the consumption histogram 300b shown in FIG. 3B depicts the media content consumption of user cluster 214 highlighted in FIG. 2B. As can be seen from FIGS. 3A and 3B, the consumption history of users within different user segments varies depending on the user session logs. Importantly, the user segment identification system clusters users based not only on types, genres, and/or other attributes of media content but also according to the consumption behavior of users. Accordingly, it will be understood that the user segment identification system could cluster users who generally enjoy similar media content in different clusters because the users may have different content consumption habits or behavior.

Additionally, the user segment identification system identifies popular actors, popular directors, and other attributes associated with media content. In particular, the user segment identification system discerns, based on the identified user segments, media content attributes (e.g., actors, directors, composers, artists, etc.) that have a correlation to particular media content clusters and user clusters. For example, the user segment identification system identifies common attributes of media content in which users within a particular user cluster have a shared interest. The user segment identification system also uses the identified shared attributes to provide content recommendation to users within user clusters. In some embodiments, the user segment identification system also provides insight to advertisers and/or media producers to inform customization of advertisements and/or media content according to the identified common interests in actors, directors, composer, or other attributes among users within a user cluster.

Figure 4:
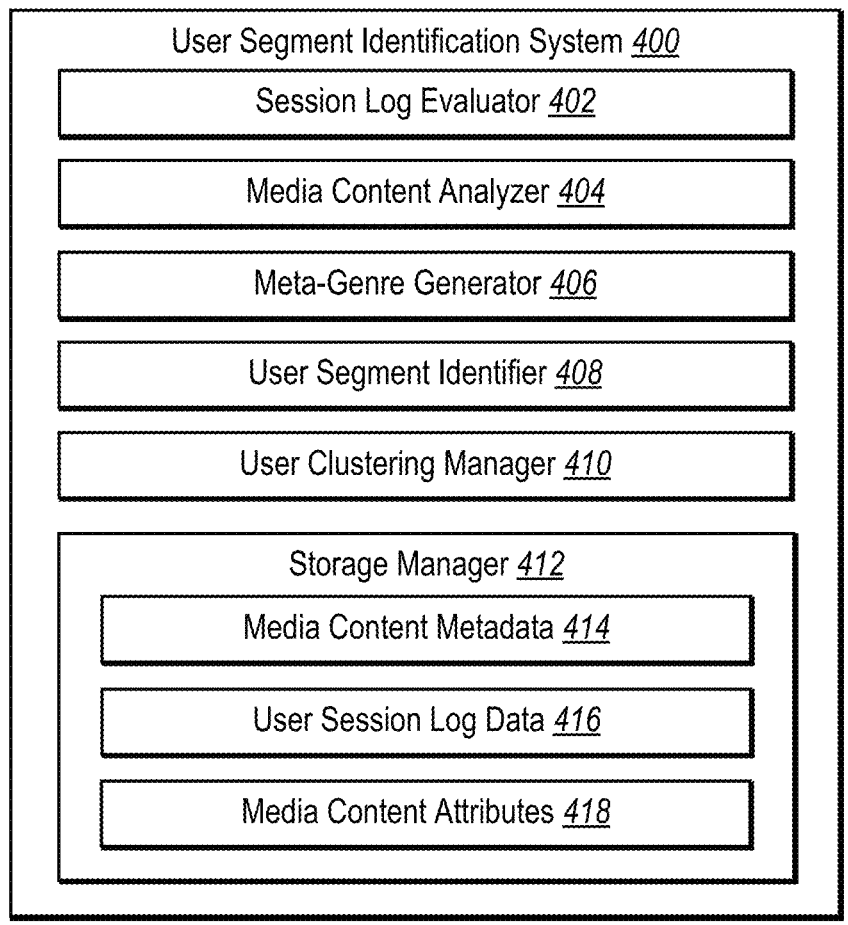
FIG. 4 illustrates a schematic diagram of a user segment identification system in accordance with one or more embodiments.

Turning now to FIG. 4, additional detail is provided regarding components and capabilities of one embodiment of the user segment identification system. In particular, FIG. 4 illustrates an embodiment of an exemplary user segment identification system 400 (e.g., the user segment identification system referenced above). As shown, the user segment identification system 400 may include, but is not limited to, a session log evaluator 402, a media content analyzer 404, a meta-genre generator 406, a user segment identifier 408, a user clustering manager 410, and a storage manager 412.

As just mentioned, and as illustrated in FIG. 4, the user segment identification system 400 includes a session log evaluator 402. The session log evaluator can evaluate, analyze, extract, delineate, and otherwise pick out information relating to media content consumption by a user. For example, the session log evaluator 402 can analyze the content consumption history of a user, including times and/or amount of content consumed as well as the name of the item of media content, including any other relevant information. Furthermore, the session log evaluator 402 can learn a content consumption behavior model based on an analysis of content consumption history as described above.

As shown in FIG. 4, the user segment identification system 400 also includes the media content analyzer 404. The media content analyzer 404 can represent an item of media content as a string of characters (e.g., a listing of genres or keywords) by performing audio recognition or other technique to transpose the media content into text. Considering the item of media content as a text document, the media content analyzer 404 can also parse the text of the document to identify keywords or other characteristics of the text. The media content analyzer 404 can identify characteristics or traits of an item of media content based on the identified terms within the textual representation of the item of media content, as described above.

As illustrated in FIG. 4, the user segment identification system 400 also includes a meta-genre generator 406. The meta-genre generator 406 considers the identified characteristics of each item of media content, and according to the algorithm discussed above, groups items of media content together based on similarities of identified characteristics therein. The meta-genre generator 406 clusters items of media content together according to the first step of the two-step algorithm (e.g., Algorithm 1). For example, the meta-genre generator 406 can convert the text representation of an item of media content into a vector space representation, where each identified keyword, attribute, etc., is a dimension within the vector. Additionally, the meta-genre generator 406 can weight the dimensions within each media content vector according to a vector weighting scheme such as TF-IDF as described above.

In addition, as shown in FIG. 4, the user segment identification system 400 includes the user segment identifier 408. The user segment identifier 408 can interact with the session log evaluator 402 to group users together according to content consumption history. For example, the user segment identifier 408 can represent each user as a vector with a number of dimensions. In addition, the user segment identifier 408 can communicate with the meta-genre generator 406 to consider each media content cluster (e.g., meta-genre) generated by the meta-genre generator 406 as a dimension within a user vector. The user segment identifier 408 can further weight each dimension within the user vector according to various vector weighting schemes such as Boolean, TW, or NT, as described above. Accordingly, the user segment identifier 408 can group users together into user clusters containing users with similar media content consumption preferences.

As shown in FIG. 4, the user segment identification system 400 also includes the storage manager 410. The storage manager 410 maintains data to perform the functions of the user segment identification system 400. Thus, the storage manager 410 can comprise memory as described below. As illustrated, the storage manager 410 includes media content metadata 412, user session log data 414, and media content attributes 416. For example, media content metadata 412 can include a length, duration, or other information associated with an item of media content. Furthermore, user session log data 414 can include information relating to times and durations of different items of media content consumed by a user as well as names and identities of such items of media content. Media content attributes 416 can include additional information relating to items of media content such as actors, directors, composers, artists, cast members, authors, etc.

Each of the components 402-416 of the user segment identification system 400 and their corresponding elements (as shown in FIG. 4) may be in communication with one another using any suitable communication technology. It will be recognized that although components 402-416 of the user segment identification system 400 and their corresponding elements are shown to be separate in FIG. 4, any of components 402-416 and their corresponding elements may be combined into fewer components, such as into a single facility or module, divided into more components, or configured into different components as may serve a particular embodiment.

The components 402-416 of the user segment identification system 400 and their corresponding elements can comprise software, hardware, or both. For example, the components 402-416 and their corresponding elements can comprise one or more instructions stored on a computer-readable storage medium and executable by processors of one or more computing devices. When executed by the one or more processors, the computer-executable instructions of the user segment identification system 400 can cause a client device and/or a server device to perform the methods described herein. Alternatively, the components 402-416 and their corresponding elements can comprise hardware, such as a special purpose processing device to perform a certain function or group of functions. Additionally, the components 402-416 and their corresponding elements can comprise a combination of computer-executable instructions and hardware.

Figure 5:
FIG. 5 illustrates a table of results of an example user segment identification system and a conventional user segment identification system for comparison purposes in accordance with one or more embodiments.

Furthermore, the components 402-416 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 402-416 may be implemented as a standalone application, such as a desktop or mobile application. Furthermore, the components 402-416 may be implemented as one or more web-based applications hosted on a remote server. The components 402-416 may also be implemented in a suite of mobile device applications. FIG. 5 illustrates a comparison of the two-step clustering algorithm (e.g., Algorithm 1) described above against an ordinary principal component analysis (PCA) clustering algorithm given, for example, by:

| Algorithm 2: Simple-Segment (User session log L) |
| --- |
| Let M = {m} be set of all items of media content in L<br>Let U = {u} be set of all users in L<br>Let V be a \|U\| × \|M\| matrix<br>// create feature vector<br>    for each m ∈ M<br>    for each u ∈ U<br>    V [u][m] = weight(m:u)<br>// reduce dimensions by Principal Component Analysis<br>Let V' be dimensionality-reduced V<br>$C_U$ = Cluster(V')<br>return $C_U$ |

FIG. 5 depicts a table 500 including metrics for the PCA algorithm as well as the two-step clustering algorithm described herein. In particular, the results of table 500 are reflective of clustering users based on a dataset including about ten thousand users with access to over four hundred items of media content, where each user's session logs were evaluated over a period of one month. The logs provide information about the items of media content consumed, the length (in time) of the items, and how much (e.g., what portion, fraction, or percent) of each item a user has consumed. On average, each user consumed about four items of media content, where the average consumption time was around 72 minutes and the average duration of each item of media content was about 97 minutes. An online database was used to access metadata related to each item of media content over a range of 51 different genres.

To compare Algorithm 1 with Algorithm 2, three different weighting schemes were used: Boolean (where $v_{m:u}$=1 if u has consumed m, else 0), TW (where $v_{m:u}$=T(u, m)), and NT (the normalized version of TW), as described above. Once each user is represented by a user vector, the dimensionality of each user vector is reduced by using PCA as described above. Additionally, k-means clustering is used to identify both movie clusters and user clusters, searching fork from 5 to 20. For the results shown in table 500 of FIG. 5, the principal components were selected such that it can explain at least 90% of the variance. To determine the number of clusters, the Silhouettes coefficient equation was used. Based on the Silhouette coefficient, the cluster size for items of media content is 15, and the user cluster size is 11 and 16 for the TW and NT weighting schemes, respectively.

After randomly selecting 80% of the user session logs to use for identifying the user segments, Algorithm 1 and Algorithm 2 are each tested by recommending the top 10 items of media content to the users in the remaining 20%. Repeating this experiment 10 times, the results shown in table 500 are determined by:

$$\text{Precision} = \frac{TP}{TP+FP} \text{ and Recall} = \frac{TP}{TP+FN}$$

where TP=items of media content recommended which are already consumed, FN=items of media content consumed which are not yet recommended, and FP=items of media content recommended but have not yet been consumed.

As shown in FIG. 5, table 500 shows the two-step algorithm outperforms the PCA algorithm. In particular, the two-step algorithm outperformed the PCA algorithm both in terms of precision and recall. Additionally, the NT weighting scheme has a better recall score than the TW weighting scheme in this case, whereas the TW weighting scheme has a better precision score.

Figure 6:
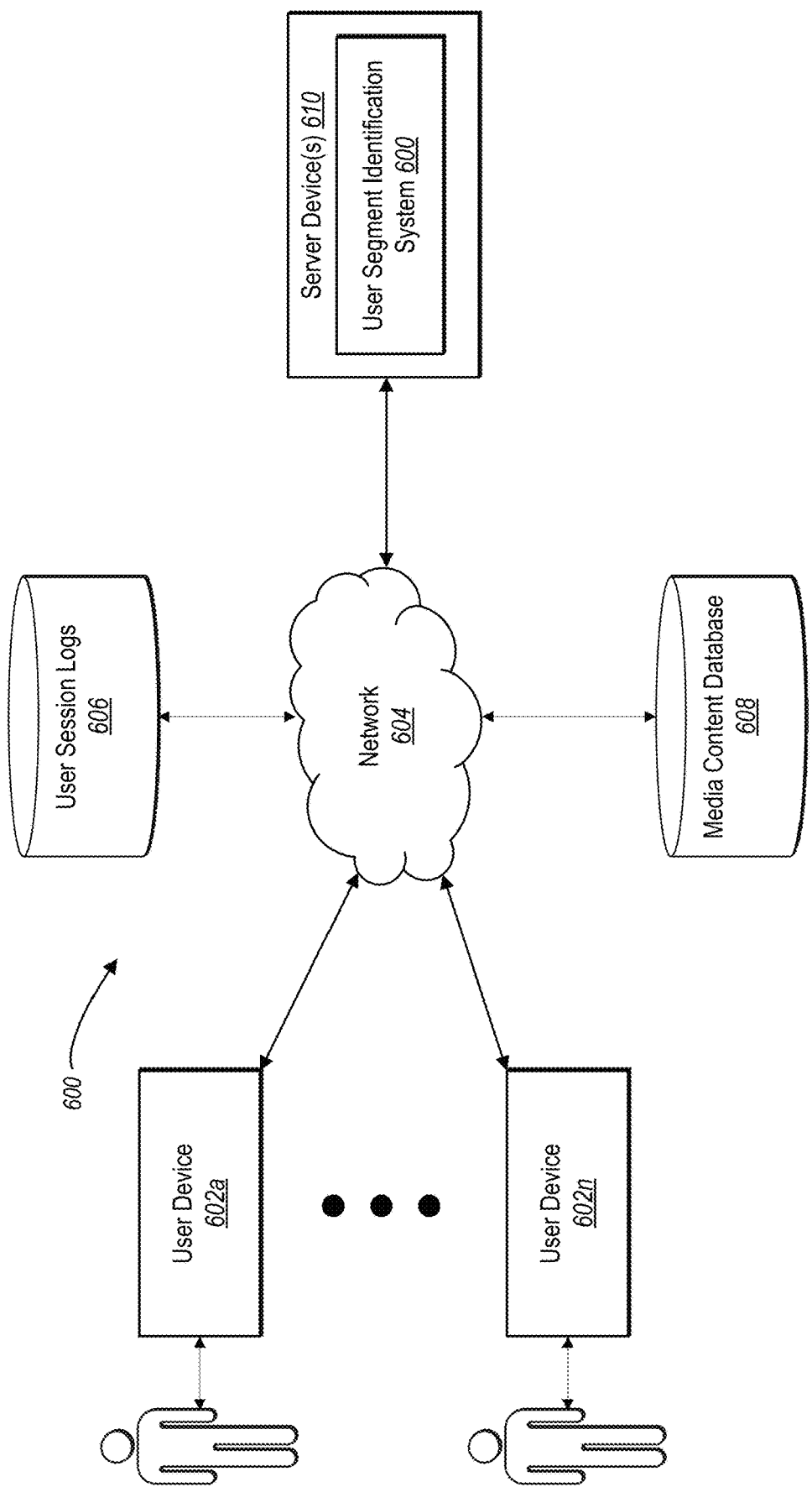
FIG. 6 illustrates an example environment in which the user segment identification system operates in accordance with one or more embodiments.

FIG. 6 illustrates a schematic diagram of one embodiment of an exemplary environment 600 in which the user segment identification system (e.g., user segment identification system 400) operates. In one or more embodiments, the exemplary environment 600 includes a number of user devices 602a-602n, a network 604, a database of user session logs 606, a media content database 608, and one or more server devices 610.

As illustrated in FIG. 6, the environment 600 may include one or more user devices 602a-602n. The user devices 602a-602n may comprise any computing device (e.g., a mobile device, a computer, a tablet, etc.). For instance, in one or more embodiments, the user devices 602a-602n comprise any computing device as described below with reference to FIG. 9. Additionally, each user device 602a-602n is associated with a user (e.g., a media content user). A user can, by way of a user device 602a-602n, access media content from a media content database 608 via network 604. In this way, a user associated with a user device can consume media content.

In addition, the environment 600 may also include a database of user session logs 606. The user session logs 606 can include a database of information relating to media content consumption for each user associated with the user devices 602a-602n. For example, the user session logs 606 can include information relating to the identities (e.g., names, titles, etc.) of items of media content accessed or consumed by a user. Furthermore, the user session logs 606 can include a history of time spent consuming various items of media content, and indications of which items of media content have been consumed by which user, and how much of each item each user has consumed.

As shown in FIG. 6, the environment 600 may also include a media content database 608. The media content database 608 can include an accessible storage of items of media content such as a database of digital images, a database of television shows, movies, songs, etc. For example, the media content database 608 could be associated with a third-party content provider such as HULU® or NETFLIX®. Users associated with user devices 602a-602 can access media content within the media content database 608 to consume via network 604.

Additionally, the environment 600 may include one or more server devices 610. The server device(s) 610 can include all or a portion of the user segment identification system 400. In particular, the user segment identification system 400 can comprise an application running on the server device(s) 610 or a portion of a software application that can be downloaded from the server device(s) 610. For example, the user segment identification system 400 can include a web hosting application that allows the one or more user devices 602a-602n to interact with content hosted at the server device(s) 610 or else with content hosted by a third party associated with the media content database 608. To illustrate, in one or more embodiments of the exemplary environment 600, the server device(s) 610 can access user session logs 606 and/or a media content database 608 associated with a user device (e.g., user device 602a) to gather metadata and content consumption information.

Although FIG. 6 illustrates a particular arrangement of the user devices 602a-602n, the network 604, the database of user session logs 606, the media content database 608, and the server device(s) 610, various additional arrangements are possible. For example, while FIG. 6 illustrates separate user devices 602a-602n communicating with a media content database 608, user session logs 606, and server device(s) 610 via the network 604, in one or more embodiments a single user device may communicate directly with the server device(s) 610, the user session logs 606, and/or the media content database 608, bypassing network 604.

Similarly, although the environment 600 of FIG. 6 is depicted as having various components, the environment 600 may have additional or alternative components. For example, the user segment identification system can be implemented on a single computing device. In particular, the user segment identification system may be implemented in whole by a user device (e.g., user device 602a), or else the user segment identification system may be implemented in whole by the server device(s) 610. Alternatively, the user segment identification system may be implemented across multiple devices or components (e.g., utilizing the user devices 602a-602n and the server device(s) 610).

By way of example, in one or more embodiments, server device 610 initiates a user segment identification process. The server device(s) 610 can generate a series of user segments or clusters according to the two-step algorithm or variation thereof as described above. For example, the server device(s) 610 can utilize the session log evaluator 402, the media content analyzer 404, the meta-genre generator 406, and the user segment 408 alone or in conjunction with a user device (e.g., user device 602a). Furthermore, the server device(s) 610 can communicate with the database of user session logs 606 and/or the media content database 608 to access metadata, content consumption information, or other information related to user interaction with media content. In response, the database of user session logs 606 and the media content database 608 can provide metadata, user session logs, and/or other relevant information to the server device(s) 610 by way of network 604.

Figure 7:
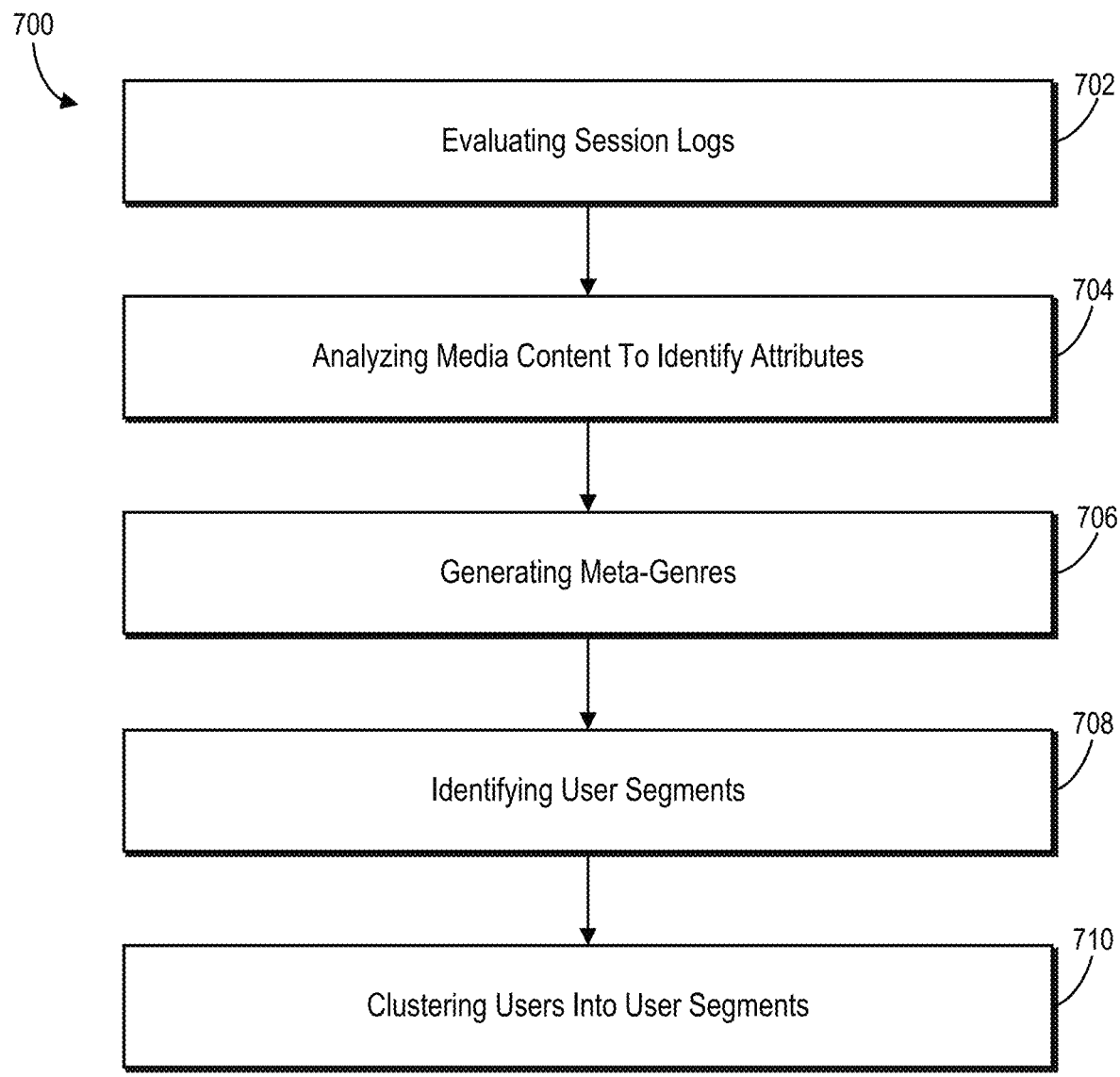
FIG. 7 illustrates a flowchart of a series of acts in a method for identifying user segments in accordance with one or more embodiments.

FIG. 1A-6, the corresponding text, and the examples provide a number of different systems and methods that perform user segment identification. In addition to the foregoing, embodiments can also be described in terms of flowcharts comprising acts and/or steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 7 illustrates a flowchart of a series of acts in a method 700 of user segment identification. In one or more embodiments, the method 700 is performed in a digital medium environment for performing one or more of media content recommendations or user recommendations for specific media content (i.e., performed by software running on one or more computing devices). The method 700 is intended to be illustrative of one or more methods in accordance with the present disclosure, and is not intended to limit potential embodiments. Alternative embodiments can include additional, fewer, or different steps than those articulated herein with respect to FIG. 7.

As illustrated in FIG. 7, the method 700 includes an act 702 of evaluating session logs. In particular, the act 702 can include evaluating session logs for a plurality of users of media content. For example, the act 702 can involve evaluating a media content consumption history within a user session log by gathering information relating to past media content consumption, including type of media content consumed, amount of media content consumed, time spent consuming media content, etc.

In addition, the method 700 includes an act 704 of analyzing media content to identify attributes. In particular, the act 704 can include analyzing one or more items of media content to identify a plurality of content attributes associated with the one or more items of media content. For example, the act 704 can involve converting each of the one or more items of media content into a text representation. The act 704 can further involve performing a text analysis on each of the one or more items of media content that have been converted into text representations. Additionally or alternatively, the act 704 can include identifying one or more content attributes within metadata associated with the one or more items of media content. The one or more content attributes within the metadata can include a creator, an actor, a director, a keyword, a genre, a topic, a name, a synopsis, etc.

As shown in FIG. 7, the method 700 also includes an act 706 of generating meta-genres. In particular, the act 706 can include generating, based on the analysis of the one or more items of media content, a set of meta-genres associated with the plurality of identified content attributes by clustering those items of media content that have similar content attributes together. For example, the act 706 of generating a set of meta-genres can include representing each item of media content as a text representation, analyzing the text representation of each item of media content to identify content attributes, converting the text representation of each item of media content into a media content vector comprising one or more dimensions that correspond to the identified content attributes, and weighting one or more dimensions of each media content vector according to a media content vector weighting scheme. In particular, the media content vector weighting scheme can involve a term frequency inverse document frequency weighting scheme, as described above. The act 706 can further include generating the set of meta-genres by using a k-means clustering algorithm, as described above.

Furthermore, the method 700 from FIG. 7 also includes an act 708 of identifying user segments. In particular, the act 708 can include identifying, for each meta-genre within the generated set of meta-genres, a user segment comprising one or more of the plurality of users of media content, based on media content consumption of each of the one or more of the plurality of users. For example, the act 708 can further involve representing a user of the plurality of users as a user vector comprising one or more dimensions, wherein each dimension corresponds to one of the set of generated meta-genres of media content from which the user has previously consumed at least a portion of an item of media content, based on the evaluation of the session logs. The act 708 can further include weighting one or more dimensions of the user vector according to a user vector weighting scheme. The user vector weighting scheme can include determining, for each of the set of generated meta-genres, whether the user associated with the user vector has consumed any media content with a given meta-genre. Additionally or alternatively, the user vector weighting scheme can further include weighting dimensions that correspond to meta-genres from which the user has consumed at least a portion of an item of media content more heavily than dimensions that correspond to meta-genres from which the user has not consumed media content. Additionally or alternatively still, the user vector weighting scheme can include counting the number of items of media content that the user has consumed, according to the evaluation of the user session logs described above. Moreover, the user vector weighting scheme can include determining an amount of time the user has spent consuming media content associated with each of the set of generated meta-genres. Furthermore, the user vector weighting scheme can include determining a normalized fraction of time the user has spent consuming media content associated with each of the set of generated meta-genres.

As illustrated in FIG. 7, the method 700 also includes an act 710 of clustering users into user segments. In particular, the act 710 can include clustering, based on the evaluation of the session logs, each of the plurality of users of media content into the identified user segments by grouping together those users whose session logs have commonalties among previously consumed items of media content. For example, the act 710 can involve clustering the plurality of users of media content into the identified user segments using a k-means clustering algorithm, as described above.

The method 700 of FIG. 7 can further include acts for generating a behavior model for each of the plurality of user segments associated with the set of meta-genres and modifying, based on the behavior model associated with a particular user segment of the plurality of user segments, one or more items of media content to target the particular user segment. In particular, the act for generating a behavior model can involve predicting future user content consumption behavior based on past content consumption behavior. Modifying media content can include providing insight to media content producers relating to media content preferences of the various user segments, or can alternatively include creating new content or changing existing media content to include attributes or traits that users within a particular user segment find appealing. Additionally, the method 700 can further include an act for providing the one or more items of modified media content to the particular user segment. Additionally or alternatively, the method 700 can include an act for providing, based on the generated behavior models corresponding to the user segments, a media content recommendation corresponding to one or more of the plurality of content attributes of the set of meta-genres associated with the user segments. The method 700 can further include an act of reducing a number of dimensions of each media content vector according to a principal component analysis. Likewise, the method 700 can include an additional act of reducing a number of dimensions of each user vector according to a principal component analysis.

Figure 8:
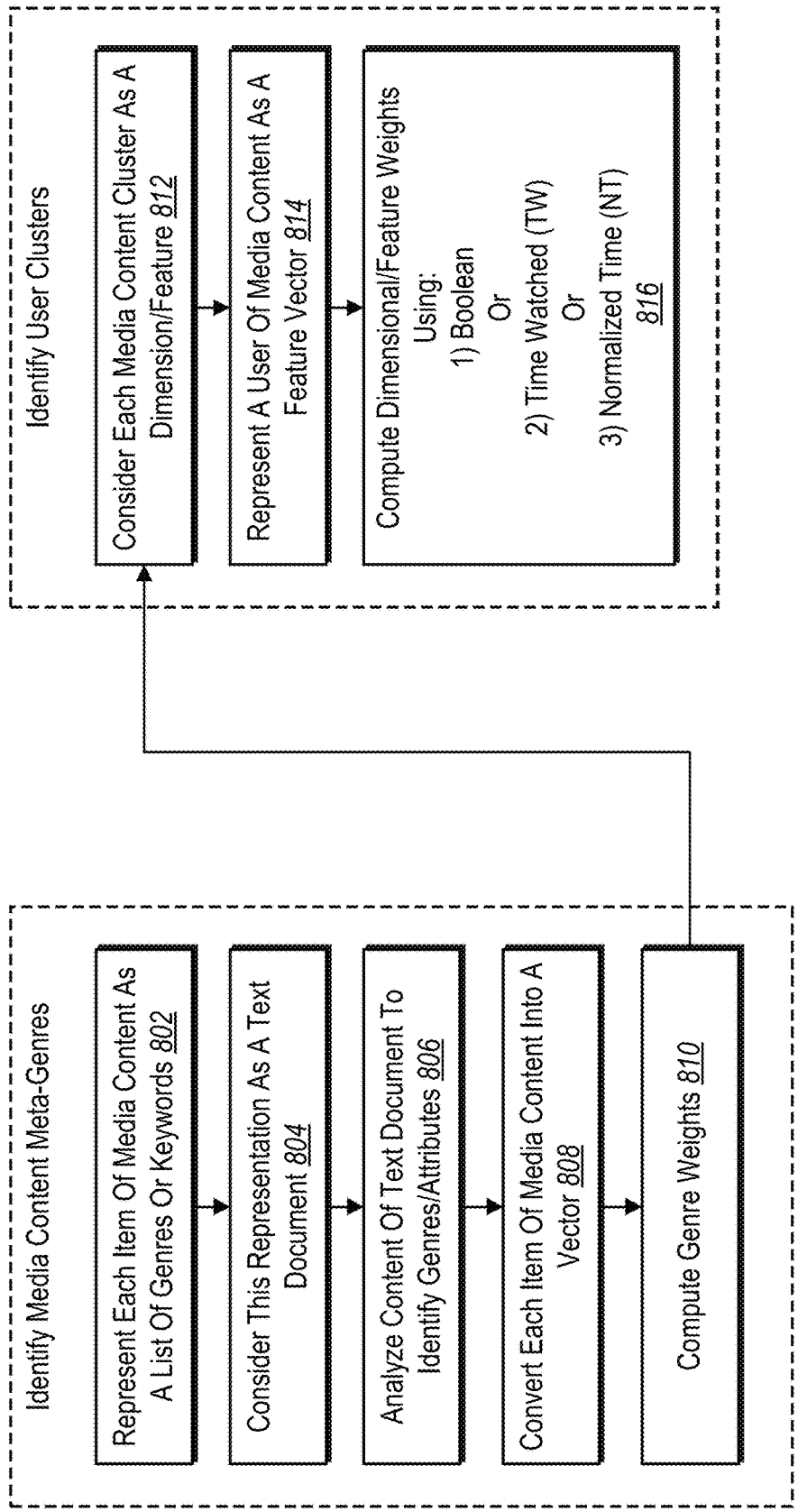
FIG. 8 illustrates a flow diagram of an algorithm for performing a step for generating a set of meta-genres associated with a plurality of content attributes in accordance with one or more embodiments and an algorithm for performing a step for categorizing the plurality of users of media content into a plurality of user segments associated with the set of meta-genres in accordance with one or more embodiments.

Looking now to FIG. 8, an algorithm illustrating acts 802-810 for performing a step for generating, based on the analysis of the one or more items of media content, a set of meta-genres associated with the plurality of identified content attributes is shown. Additionally, FIG. 8 also illustrates acts 812-816 for performing a step for categorizing users of media content into a plurality of user segments associated with the set of meta-genres generated by acts 802-810.

In particular, as shown in FIG. 8, the algorithm includes act 802 to represent each item of media content as a list of genres or keywords. Act 802 involves converting each item of media content into a list of genres or keywords by transposing each item of media content into a text list by performing audio recognition or other types of analysis, as described in more detail above.

Additionally, the algorithm illustrated in FIG. 8 includes act 804 to consider the list representation of each item of media content as a text document. In particular, act 804 may include converting the listing of genres or keywords into a text document. Furthermore, the act 804 may also involve performing a speech-to-text function. The act 804 may involve treating the listing of words as a text document by analyzing the listing as a string of characters as described in detail above.

The algorithm also includes an act 806 to analyze content of the text document to identify genres or other attributes. The act 806 can also involve identifying keywords or terms within the converted text representation of each item of media content that indicate a genre or other attribute associated with the item of media content. Identifying keywords or terms in this way can involve parsing text or other methods as described above.

Furthermore, the algorithm of FIG. 8 includes an act 808 to convert each item of media content into a vector. For example, the act 808 may involve converting each item of content into a media content vector with a number of dimensions. The act 808 may further involve treating each genre, keyword, or other attribute as a dimension within each media content vector. In other words, each media content vector may have the same number of vectors as genres or keywords identified in the text representation of the respective item of media content.

As shown in FIG. 8, the algorithm further includes an act 810 to compute genre weights. In particular, the act 810 may involve implementing a vector weighting scheme as described above. For example, the vector weighting scheme may include a Boolean weighting scheme, a TW weighting scheme, or a NT weighting scheme.

As shown in FIG. 8, an algorithm illustrating acts 812-816 for identifying user clusters is shown. In particular, the algorithm includes acts for performing a step for categorizing, based on the evaluation of the session logs, the plurality of users of media content into a plurality of user segments associated with the set of meta-genres.

In particular, the algorithm illustrating acts 821-816 includes an act 812 to represent each media content cluster as a feature/user vector. The act 812 may involve representing each user as a user vector having a number of dimensions that corresponding to the number of media content clusters (e.g., meta-genres) identified in the above description.

Additionally, the algorithm includes an act 814 to consider each above-mentioned media content cluster as a dimension or feature within the feature/user vectors. The act 814 may involve treating each media cluster as a dimension within each user vector. In other words, the act 814 may involve treating each user cluster as a user vector with the same number of dimensions as media clusters identified above.

Furthermore, the algorithm includes an act 816 to compute dimensional/feature weights. In particular, the act 816 can involve using a Boolean determination to weight each dimension of the user vectors, as described above. Additionally or alternatively, the act 816 can involve using the TW weighting scheme to weight each dimension of the user vectors, as further described above. Additionally or alternatively still, the act 816 can involve using the NT weighting scheme as shown in FIG. 8 to weight each dimension of the user vectors, as further described above.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
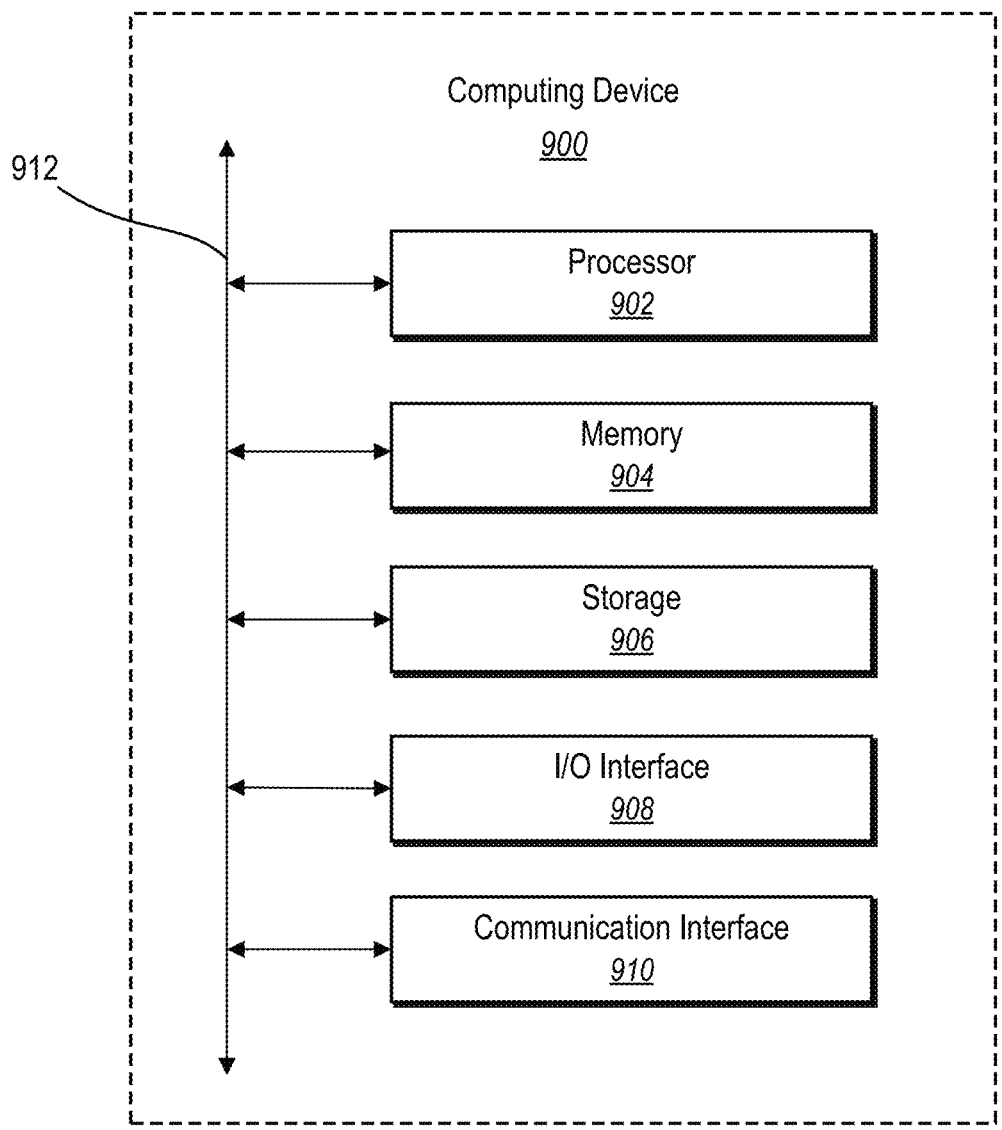
FIG. 9 illustrates a block diagram of an example computing device in accordance with one or more embodiments.

FIG. 9 illustrates, in block diagram form, an exemplary computing device 900 that may be configured to perform one or more of the processes described above. One will appreciate that the user segment identification system 900 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for providing customized media content to users, a computer-implemented method of identifying user segments based on similarity in content consumption among users, comprising:

evaluating session logs for a plurality of users of media content;

determining content attributes associated with one or more items of media content by performing a content-type-specific analysis comprising one or more of a text recognition analysis of textual content, an audio recognition analysis of audio content, or a video analysis of video content;

generating textual representations to reflect the content attributes of the one or more items of media content based on the content-type-specific analysis;

a step for generating, based on the textual representations of the one or more items of media content, a set of meta-genres associated with the content attributes;

a step for categorizing, based on the evaluation of the session logs, the plurality of users of media content into a plurality of user segments associated with the set of meta-genres; and providing, to a user device associated with a user within a user segment and based on a session log of the user, a content recommendation for an item of media content which the user has not yet consumed and which is within a meta-genre corresponding to the user segment.

2. The computer-implemented method of claim 1, further comprising:

generating, based on the user segments, a behavior model for each of the plurality of user segments associated with the set of meta-genres; and modifying, based on the behavior model associated with a particular user segment of the plurality of user segments, one or more items of media content to target the particular user segment.

3. The computer-implemented method of claim 2, further comprising:

providing the one or more items of modified media content to the particular user segment.

4. The computer-implemented method of claim 1, further comprising:

generating, based on the user segments, a behavior model for each of the plurality of user segments associated with the set of meta-genres; and providing, based on the generated behavior models corresponding to the user segments, a media content recommendation corresponding to one or more of the plurality of content attributes of the set of meta-genres associated with the user segments.

5. In a digital medium environment for providing customized media content to users, a computer-implemented method of identifying user segments based on similarity in content consumption among users, comprising:

evaluating session logs for a plurality of users of media content;

determining content attributes associated with the one or more items of media content by performing a content-type-specific analysis comprising one or more of a text recognition analysis of textual content, an audio recognition analysis of audio content, or a video analysis of video content;

generating textual representations to reflect the content attributes of one or more items of media content based on content-type-specific analysis;

converting, utilizing a vector space model, the textual representations of the one or more items of media content into vector representations comprising vectors of terms corresponding to the content attributes;

generating a set of meta-genres by clustering, based on similarities between the vector representations for the one or more items of media content, the one or more items of media content into respective meta-genres comprising different weighted combinations of a plurality of genres associated with the one or more items of media content;

categorizing, the plurality of users into user segments corresponding to the set of meta-genres, the user segments comprising vector representations of users who consume media within respective meta-genres of the set of meta-genres; and providing, to a user device associated with a user within a user segment and based on a session log of the user, a content recommendation for an item of media content which the user has not yet consumed and which is within a meta-genre corresponding to the user segment.

6. The computer-implemented method of claim 5, wherein converting the textual representations of the one or more items of media content into vector representations comprises:

determining a number of content attributes from the text recognition analysis of a textual representation;

generating, for the textual representation, a media content vector comprising a number of dimensions equal to the number of content attributes; and weighting one or more dimensions of the media content vector according to a media content vector weighting scheme.

7. The computer-implemented method of claim 6, wherein the media content vector weighting scheme comprises a term frequency inverse document frequency weighting scheme.

8. The computer-implemented method of claim 6, further comprising reducing the number of dimensions of the media content vector according to a principal component analysis.

9. The computer-implemented method of claim 5, further comprising identifying the user segment corresponding to the meta-genre by:

generating, for the user of the plurality of users, a user vector comprising one or more dimensions, wherein each of the one or more dimensions corresponds to one of the set of meta-genres; and weighting the one or more dimensions of the user vector according to a user vector weighting scheme.

10. The computer-implemented method of claim 9, wherein the user vector weighting scheme comprises determining, for each of the set of meta-genres, whether the user associated with the user vector has consumed any media content within a given meta-genre.

11. The computer-implemented method of claim 10, wherein the user vector weighting scheme further comprises weighting dimensions that correspond to meta-genres from which the user has consumed at least a portion of an item of media content more heavily than dimensions that correspond to meta-genres from which the user has not consumed media content.

12. The computer-implemented method of claim 9, wherein the user vector weighting scheme comprises counting, based on evaluating the session logs, a number of items of media content that the user has consumed.

13. The computer-implemented method of claim 9, wherein the user vector weighting scheme comprises determining an amount of time the user has spent consuming media content associated with each of the set of generated meta-genres.

14. The computer-implemented method of claim 9, wherein the user vector weighting scheme comprises determining a normalized fraction of time the user has spent consuming media content associated with each of the set of generated meta-genres.

15. The computer-implemented method of claim 9, further comprising reducing a number of dimensions of the user vector according to a principal component analysis.

16. The computer-implemented method of claim 5, wherein clustering the plurality of users of media content into the user segments comprises using a k-means clustering algorithm.

17. The computer-implemented method of claim 5, wherein generating the set of meta-genres comprises using a k-means clustering algorithm.

18. The computer-implemented method of claim 5, wherein analyzing the one or more items of media content to identify a plurality of content attributes comprises identifying one or more content attributes within metadata associated with the one or more items of media content.

19. The computer-implemented method of claim 18, wherein the one or more content attributes within the metadata comprises one or more of: a creator, an actor, a director, a keyword, a genre, a topic, a name, or a synopsis.

20. A system for identifying user segments based on similarity in content consumption among users, comprising:

a memory comprising:

media content meta-genre data that allows for a determination of similarities within media content; and user segment data that allows for a determination of similarities between users of media content; and a server device comprising instructions thereon that, when executed by at least one processor, cause the server device to:

evaluate session logs for a plurality of users of media content;

determine content attributes associated with one or more items of media content by performing a content-type-specific analysis comprising one or more of a text recognition analysis of textual content, an audio recognition analysis of audio content, or a video analysis of video content;

generate textual representations to reflect the content attributes of one or more items of media content based on the content-type specific analysis by:

identifying a plurality of genres associated with the one or more items of media content; and generating, for the one or more items of media content, lists of keywords representing the one or more items of media content;

convert, utilizing a vector space model, the textual representations of the one or more items of media content into vector representations by:

determining numbers of keywords within the lists of keywords; and generating vector representations comprising numbers of dimensions equal to corresponding numbers of keywords within respective lists of keywords for the one or more items of media content;

generate, based on the vector representations for the one or more items of media content, a set of meta-genres by clustering items of media content into respective meta-genres comprising different weighted combinations of the plurality of genres associated with the one or more items of media content;

categorize, the plurality of user into user segments corresponding to the set of meta-genres, the user segments comprising vector representations of users who consume media within respective meta-genres of the set of meta-genres; and provide, to a user device associated with a user within a user segment and based on a session log of the user, a content recommendation for an item of media content which the user has not yet consumed and which is within a meta-genre corresponding to the user segment.

\* \* \* \* \*